United States Patent
Joshi et al.

(10) Patent No.: US 7,801,174 B2
(45) Date of Patent: Sep. 21, 2010

(54) TECHNIQUES FOR EFFICIENT CONTROL OF AGGREGATING WIRELESS VOICE COMMUNICATIONS

(75) Inventors: Niranjan Joshi, Morris Plains, NJ (US); Achilles G. Kogiantis, Madison, NJ (US); Ashok N. Rudrapatna, Basking Ridge, NJ (US); Ganapathy S. Sundaram, Hillsborough, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1535 days.

(21) Appl. No.: 11/025,782

(22) Filed: Dec. 29, 2004

(65) Prior Publication Data

US 2006/0140216 A1    Jun. 29, 2006

(51) Int. Cl.
*H04J 3/16* (2006.01)
*H04J 3/22* (2006.01)
*H04J 3/24* (2006.01)
*H04J 3/18* (2006.01)

(52) U.S. Cl. .............. 370/468; 370/473; 370/477; 370/493; 370/495

(58) Field of Classification Search ............ 370/229, 370/235, 236, 310, 318, 328, 332, 468, 473, 370/477, 493, 494, 495
See application file for complete search history.

(56) References Cited

U.S. PATENT DOCUMENTS

| 6,252,865 | B1 | 6/2001 | Walton et al. | |
|---|---|---|---|---|
| 6,594,245 | B1* | 7/2003 | Rimhagen et al. | 370/337 |
| 6,775,254 | B1* | 8/2004 | Willenegger et al. | 370/329 |
| 6,987,729 | B1* | 1/2006 | Gopalakrishnan et al. | 370/230 |
| 7,002,993 | B1* | 2/2006 | Mohaban et al. | 370/471 |
| 7,089,320 | B1* | 8/2006 | Biederman et al. | 709/234 |
| 2002/0110101 | A1* | 8/2002 | Gopalakrishnan et al. | 370/335 |
| 2002/0196753 | A1* | 12/2002 | Famolari | 370/335 |
| 2003/0032440 | A1* | 2/2003 | Sato et al. | 455/517 |
| 2003/0035413 | A1* | 2/2003 | Herle et al. | 370/352 |
| 2003/0086393 | A1* | 5/2003 | Vasudevan et al. | 370/330 |

(Continued)

FOREIGN PATENT DOCUMENTS

EP    0 269 202 A2    6/1988

(Continued)

OTHER PUBLICATIONS

European Search Report relating to Application No. EP 05 25 7704, dated Feb. 13, 2006.

*Primary Examiner*—Chi H Pham
*Assistant Examiner*—Farah Faroul
(74) *Attorney, Agent, or Firm*—Carlson, Gaskey & Olds, P.C.

(57) ABSTRACT

A wireless communication system (20) includes a wireless network (30) that selectively modifies an aggregation of voice over internet protocol wireless transmissions. In one example, a mobile station geometry provides an indication whether modification of the aggregation is desirable. For example, a mobile station with a better geometry allows for a higher level of aggregation. Another disclosed example includes determining a current cell load condition and increasing the amount of aggregation and the level of aggregation as cell load conditions increase. Another disclosed technique includes staggering the scheduling of aggregated packets to avoid delays at a scheduler. One or more of the disclosed techniques may be used to efficiently transmit voice over internet protocol communications.

13 Claims, 2 Drawing Sheets

U.S. PATENT DOCUMENTS

| | | |
|---|---|---|
| 2003/0228865 A1 | 12/2003 | Terry |
| 2004/0090916 A1* | 5/2004 | Hosein ........................ 370/235 |
| 2004/0120276 A1* | 6/2004 | Golla et al. ................. 370/321 |
| 2004/0125747 A1* | 7/2004 | Samadi et al. .............. 370/230 |
| 2004/0170125 A1* | 9/2004 | O'Neill ....................... 370/230 |
| 2005/0053066 A1* | 3/2005 | Famolari ..................... 370/389 |
| 2005/0083999 A1* | 4/2005 | Koo et al. ................... 375/148 |
| 2005/0122960 A1* | 6/2005 | Khan .......................... 370/352 |
| 2005/0198007 A1* | 9/2005 | Ossman ......................... 707/3 |
| 2006/0056443 A1* | 3/2006 | Tao et al. .................... 370/462 |
| 2006/0073786 A1* | 4/2006 | Sarkar ........................... 455/24 |
| 2006/0153232 A1* | 7/2006 | Shvodian .................... 370/468 |
| 2006/0205443 A1* | 9/2006 | Simoens et al. ............. 455/574 |
| 2007/0165670 A1* | 7/2007 | Nagai et al. ................. 370/470 |
| 2008/0005392 A1* | 1/2008 | Amini et al. ................. 710/29 |

FOREIGN PATENT DOCUMENTS

| | | |
|---|---|---|
| WO | 03063518 A2 | 7/2003 |
| WO | WO 2004/079971 A2 | 9/2004 |

\* cited by examiner

TECHNIQUES FOR EFFICIENT CONTROL OF AGGREGATING WIRELESS VOICE COMMUNICATIONS

FIELD OF THE INVENTION

This invention generally relates to telecommunications. More particularly, this invention relates to wireless communication systems.

DESCRIPTION OF THE RELATED ART

Wireless communication systems have grown in capability and popularity. There are now various wireless service providers that provide voice, data and video communication capabilities to mobile units such as cell phones, personal digital assistants and notebook computers. With the increase in the number of service providers and the increased technological capabilities, wireless communications have become more and more widely used.

While known communication systems such as wireless systems are designed to meet various demands of subscribers, service providers continuously seek ways to improve the overall performance of the communication system. For example, efforts have been made to increase the throughput in wireless communications as they become more popular for subscribers to obtain data (i.e., email or information from the internet) using wireless mobile units.

For example, wireless third generation (3G) communication systems are currently introducing technologies in order to become spectrally efficient while supporting data services. These efforts have resulted in the development of the 3G 1x-EVDV standard, an evolution of the CDMA 2000 standard from the 3G PP2 body of standards. Similarly, the Universal Mobile Telecommunication System (UMTS) standard has introduced several advanced technologies as part of the high speed downlink packet access (HSDPA) specification. Dedicated or shared packet data channels (PDCH) under the CDMA standard are also known. One aspect of all of these example technologies is to ensure that any associated communications are carried in an efficient manner.

The nature of data transmissions allows for different handling techniques compared to voice transmissions. For example, data transmissions tend to be bursty in nature and can be sent at spaced intervals. Voice communications, on the other hand, tend to be continuous and require different strategies for providing reliable and desirable service to subscribers.

It is possible to transmit voice or other real-time communications in packets. One example of this type of communication is known as voice over internet protocol (VoIP). It would be useful to be able to efficiently handle voice packet communications in a wireless communication system. The present invention provides several techniques for efficiently transmitting such communications.

SUMMARY OF THE INVENTION

An exemplary disclosed method of communicating includes selectively modifying an aggregation of real-time packet frames for achieving a desired efficiency associated with transmitting the frames.

In one example, the method includes modifying the aggregation responsive to a current cell load condition. In one example, selecting a level of aggregation allows for reducing a number of transmissions. For example, when the cell is highly loaded, using a maximum possible level of aggregation for a maximum possible number of mobile stations allows for reducing the number of transmissions, which increases efficiency.

In another example, the timing of transmission for at least some aggregated packets is staggered such that they are not queued-up simultaneously for service. This enhances efficiencies in a base station scheduler, for example.

In another example, the method includes modifying the aggregation based upon a current mobile station geometry. In one example, the level of aggregation corresponds to the geometry. For mobile stations having higher geometries (i.e., better channel conditions), a higher level of aggregation is possible and, in some instances, preferred. On the other hand, for mobile stations with a lower geometry (i.e., poor channel conditions) lower aggregation levels are desired to ensure reliable transmissions to such a mobile station.

In one example, different levels of aggregation are used for different users or mobile stations, depending at least in part on the geometry of the mobile station.

In one example, when a mobile station geometry is below a selected threshold, aggregation of frames intended for that mobile station is at least temporarily stopped. This approach recognizes that certain mobile station geometries will not result in successful transmission of aggregated frames and, for conserving resources, such aggregation can be temporarily stopped. In one example, transmission to such a mobile station is turned off at least temporarily. In one example, the mobile station receives an indication that no reception should be expected for a brief time.

In another example, low Doppler users have a lower level of aggregation than users with relatively higher Doppler.

The various features and advantages of this invention will become apparent to those skilled in the art from the following detailed description. The drawings that accompany the detailed description can be briefly described as follows.

DETAILED DESCRIPTION

Figure 1:
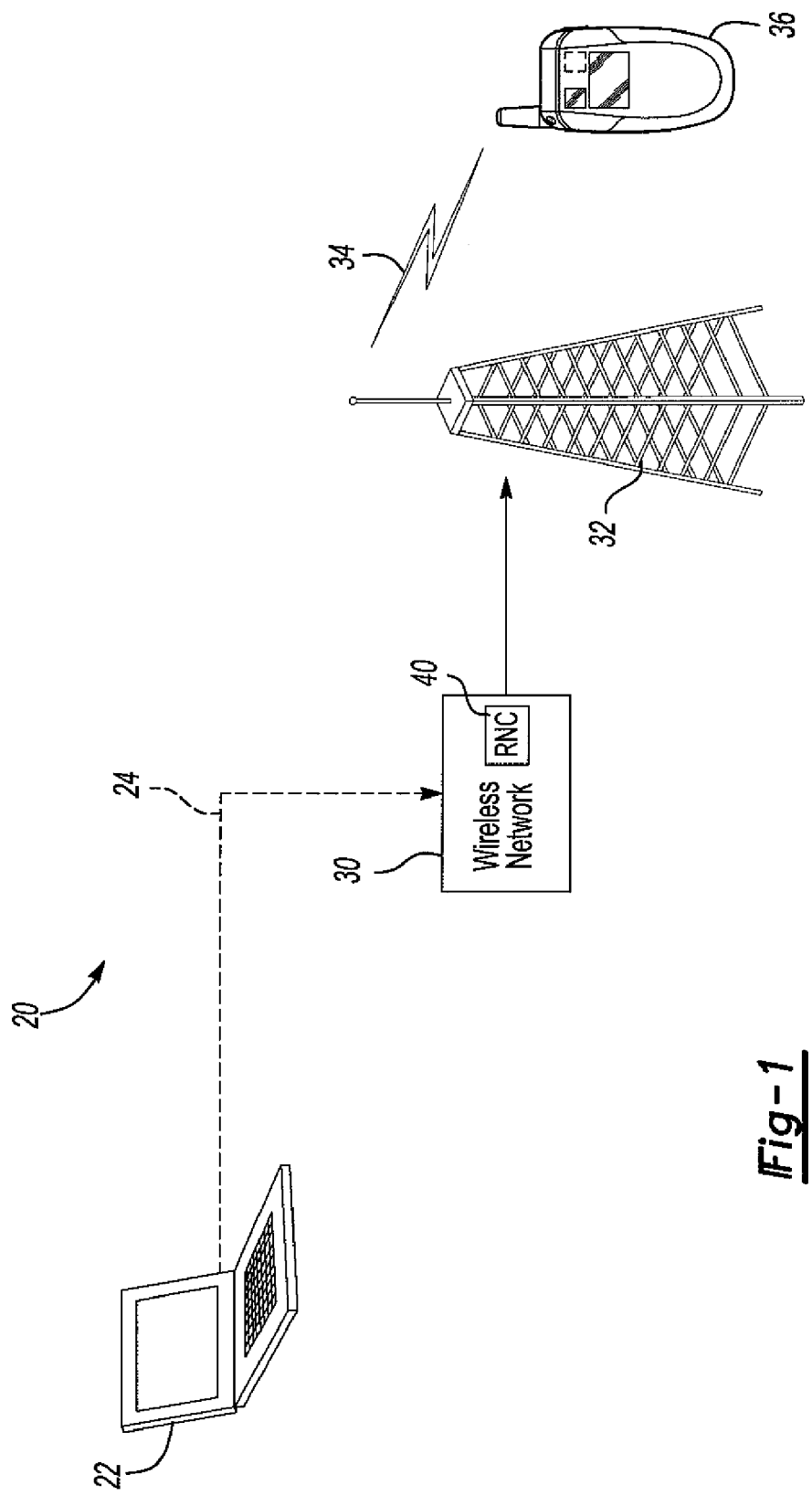
FIG. 1 schematically illustrates selected portions of a wireless communication system that is capable of wirelessly transmitting voice packet communications.

FIG. 1 schematically shows a wireless communication system 20. A source 22 of a real-time packet communication may be one of a variety of known devices. For example, the source 22 may be a mobile unit such as a cell phone, notebook computer or a personal digital assistant. In such examples, a communication link 24 between the source 22 and a wireless network 30 will be at least partially wireless. In other examples, the source 22 may be a line-based device in which case the communication link 24 includes known transmission lines.

A voice packet communication is one example real-time packet communication. This description uses voice over internet protocol (VoIP) communications as an example type of communication for purposes of discussion. A VoIP communication can be referred to as a packetized real-time communication or a voice packet communication because the voice information can be handled in packets that can be transmitted as if they were data packets. This invention is not necessarily limited to VoIP communications and is useful for other packetized voice or other appropriately formatted real-time packet communications, for example.

The wireless network 30 comprises known components capable of receiving and handling at least VoIP communications. The wireless network 30 uses known techniques for processing the VoIP communication such that a base station 32 associated with the wireless network 30 provides a wireless transmission 34 of the VoIP communication to a mobile station 36. The example system is capable of using the disclosed example techniques on a forward link or a reverse link.

In one example, the wireless network 30 is capable of operating according to at least one standard such as 1x EV-DV. Other known communication systems such as 3G1x and EVDO, EVDV or UMTS R99 with HSDPA/EUDCH may be used, for example. In one example, the wireless network 30 is capable of supporting real-time (i.e., voice) communications using circuit switched connections where dedicated communication channels are used in a known manner to communicate transmissions to or from mobile stations. In one example, the wireless network 30 is at least capable of supporting transmissions on shared communication channels such as packet data channels (PDCH) or an equivalent such that data or another packetized communication is accessible using mobile stations such as the example mobile station 36.

For VoIP communications, as example real-time packet communications, the wireless network 30 selects one or more techniques described below for managing the VoIP communications to maintain or enhance the efficiency of the network 30. For example, one measure of network efficiency is the number of subscribers serviced by a cell. Another example measure of efficiency is the conservation of resources such as base station power and code/time/frequency occupation.

In the illustrated example, a radio network controller 40 of a radio access network portion of the wireless network 30 includes hardware, software, firmware or a combination of these for making the decision on which of the described techniques to select for managing VoIP transmissions. Given this description, those skilled in the art will be able to customize or design an appropriate radio network controller to meet the needs of their particular situation. Similarly, those skilled in the art who have the benefit of this description will realize which portion of a wireless network or base station will be best suited for making the determination regarding which technique will provide a benefit for facilitating efficient VoIP transmission to meet their particular needs.

Figure 2:
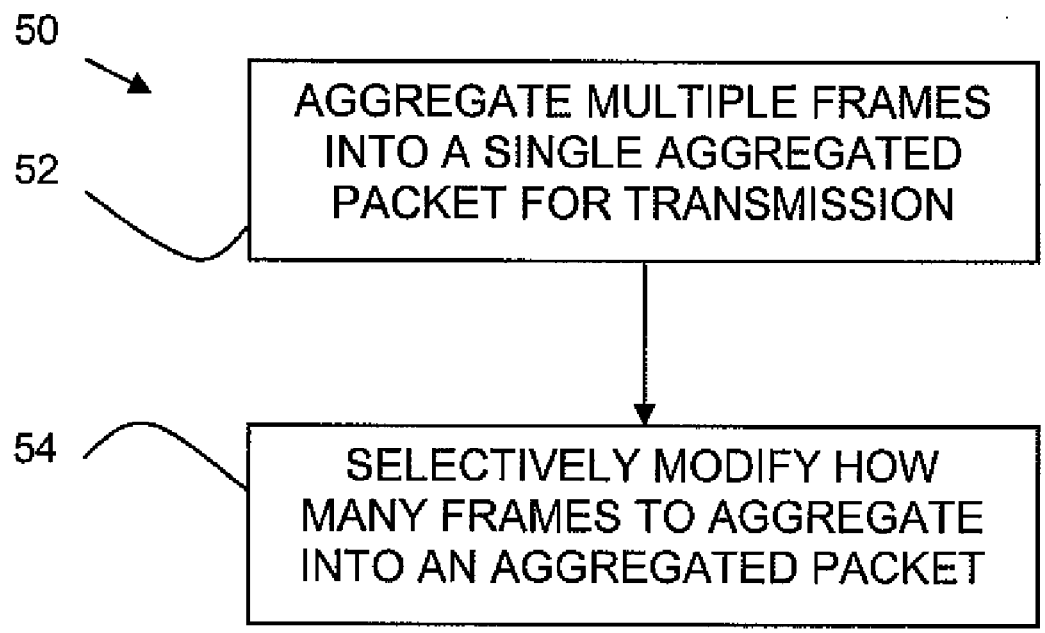
FIG. 2 is a flowchart diagram summarizing one example approach.

This description includes several techniques for modifying aggregation of VoIP frames that are aggregated into an aggregated packet. In one example summarized in the flowchart 50 of FIG. 2, at least two VoIP frames are aggregated at 52 for transmission together as a single transmitted, aggregated packet. As shown at 54, any number of frames may be aggregated into a packet, depending on the characteristics of a given system. In one example, a maximum of four frames may be aggregated into a single packet while still maintaining appropriate transmission to provide desirable VOIP service.

One example technique for maintaining or enhancing efficiency when frame aggregation is used for VoIP transmission includes staggering the aggregated packets to ensure that the packets are not queued-up simultaneously for service, which would otherwise create unnecessary queuing and associated delays at a scheduler. In one example, staggering includes beginning the transmission of the packets at non-integer multiples of the packet durations such that the packets partially overlap with adjacent (in time) packets. Such overlapping packets can be to or from different users.

In one example, such staggering occurs at a base station so that the base station scheduler does not experience delays that may be associated with simultaneously scheduling multiple aggregated packets. In other words, the aggregation is modified by adjusting a timing for transmission of the aggregated packets, which can avoid delays at a scheduler, for example.

Another technique takes into account the geometry of a mobile station. The term "user geometry" as used in this description should be understood to include the long term ratio of signal to interference-plus-noise. As known, this ratio is calculated as a long term average of the instantaneous channel conditions at the mobile station and is indicative of how strong the desired signal is compared to the noise level and any interference produced by other sources.

In one example, the geometry of each mobile station (i.e., the current channel condition for each mobile station) is evaluated to determine whether the geometry is favorable or such that poor transmission or reception quality may result. When a geometry is relatively high (i.e., good channel conditions), a higher level of aggregation may be used. When the geometry is relatively low (i.e., poor channel conditions), a lower level of aggregation or no aggregation may be used. This technique takes into account the recognition that lower geometries have an increased likelihood of failed transmissions. Using aggregation may increase the amount of such failures. Therefore, modifying the aggregation based upon a mobile station's geometry allows for more efficient transmissions and more desirable results.

In one example, determining the geometry of a mobile station includes comparing that geometry to a selected threshold below which reliable transmission is not expected. For example, it is possible to determine a threshold below which a mobile station's geometry will not provide reliable transmissions to that mobile station. In one example, whenever a mobile station geometry is below such a threshold, no aggregation is used for transmitting to that mobile station on at least a temporary basis until the geometry changes or improves. In one example, when a mobile station geometry is below such a threshold, the forward link transmission on the appropriate channel (i.e., a PDCH) is turned off to conserve resources such as available slots and power.

In one example where such a channel condition threshold is employed, the mobile station receives a message indicating that the user of that mobile station should not expect to properly receive or decode any VoIP packets at any data rate for at least a short period of time. In one example, a follow up message provides an indication that normal transmission will resume so that the user knows or can determine that there is an expectation for properly receiving further transmissions.

In another example, the Doppler conditions associated with a mobile station are taken into account for determining how to modify the aggregation. In one example, low Doppler users have a relatively lower level of aggregation compared to users having relatively higher Doppler. Low Doppler users tend to have poorer transmissions and, therefore, a lower level of aggregation tends to reduce the likelihood of a lost transmission, for example.

In another example, the method includes modifying the aggregation based upon current cell load conditions. This technique takes into account the consumption of resources required for each transmission. For example, each transmission, whether aggregated or an individual frame, utilizes a certain amount of time. To maintain efficiency, using less transmission time is better. Accordingly, one example includes reducing the number of transmissions by increasing the level of aggregation as much as possible.

Changing the level of aggregation responsive to current cell load conditions in one example includes increasing the amount of aggregation (i.e., to as many mobile stations as possible) and the level of aggregation (i.e., aggregating as many frames together into aggregated package as possible)

when a cell load condition is high. Increasing the aggregation reduces the number of transmissions and, therefore, increases efficiency and enhances the ability to service more mobile stations.

In one example, whenever a cell load condition is relatively low and reducing the amount of aggregation will provide enhanced service to at least one mobile station, modifying the aggregation level to at least such a mobile station is implemented.

In some examples, the aggregation will be performed at a base station. In other examples, as mentioned above, a radio network controller (RNC) or a media gateway (MGW), for example, may perform the frame aggregation. Under such circumstances, appropriate communication between a base station serving a particular mobile station and the RNC or MGW facilitates implementing modifying the aggregation based upon mobile station geometry or cell load conditions. Those skilled in the art who have the benefit of this description will realize how to accomplish such communications for appropriate information exchange to facilitate the corresponding aggregation modifications. In some examples, the base station and the RNC will be part of the same base station router. In some such examples, the base station router is responsible for the aggregation. In other examples, an external router located at an edge of the network (i.e., a so-called edge router) is responsible for the aggregation.

In one example, at least one of the techniques described above is used. In another example, a combination of more than one is used. In some examples, the example control techniques are used for downlink communication while in other examples, the disclosed techniques are used for uplink communications, also. Those skilled in the art who have the benefit of this description will realize how best to implement one or more of the disclosed techniques to maintain or enhance efficiency when transmitting wireless VoIP communications within a given system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating between a base station and a mobile station, comprising
    selectively modifying an aggregation of real-time frames by the base station for transmitting the real-time frames from the base station to the mobile station; and
    aggregating the real-time frames into a plurality of aggregated packets and staggering a timing of transmission for at least some of the aggregated packets by beginning the transmission of the aggregated packets at non-integer multiples of durations of the aggregated packets, wherein at least one of the aggregated packets partially overlaps with an adjacent aggregated packet.

2. The method of claim 1, comprising selecting a level of aggregation for reducing a number of transmissions.

3. The method of claim 1, comprising
    determining a cell load condition; and
    selecting a level of aggregation responsive to the determined cell load condition.

4. The method of claim 3, comprising using a maximum possible level of aggregation for a maximum number of mobile stations responsive to determining a high cell load condition.

5. The method of claim 1, comprising aggregating frames into a plurality of aggregated packets and staggering the timing of transmission for at least some of the aggregated packets, wherein a duration of a first packet is less than a difference in time between a send time for the first packet and a send time for a next, subsequent packet.

6. The method of claim 1, comprising
    modifying the aggregation by performing at least one of:
        selecting a level of aggregation for reducing a number of transmissions on a forward link;
        selecting a level of aggregation responsive to a current mobile station geometry;
        selecting a level of aggregation responsive to a mobile station Doppler; or
        selecting a first aggregation level for a first mobile station and selecting a second, different aggregation level for a second mobile station.

7. The method of claim 1, wherein the real-time frames comprise a voice communication.

8. The method of claim 7, wherein the real-time frames comprise a voice over Internet protocol communication.

9. The method of claim 1, comprising
    modifying the aggregation responsive to a current cell load condition.

10. A method of communicating between a base station and a mobile station, comprising
    selectively modifying an aggregation of real-time frames by the base station for transmitting the real-time frames from the base station to the mobile station;
    aggregating real-time frames into a plurality of aggregated packets and staggering a timing of transmission for at least some of the aggregated packets by beginning the transmission of the aggregated packets at non-integer multiples of durations of the aggregated packets, wherein at least one of the aggregated packets partially overlaps with an adjacent aggregated packet; and
    selecting a first aggregation level for a first mobile station and selecting a second, different aggregation level for a second mobile station.

11. The method of claim 10, comprising using a higher level of aggregation for a first geometry and using a second, lower level of aggregation for a second, lower geometry.

12. The method of claim 10, comprising determining a geometry of all mobile stations serviced by a cell and using a level of aggregation for each mobile station corresponding to the respective determined geometry.

13. The method of claim 10, comprising
    modifying the aggregation by performing at least two of
        selecting a level of aggregation responsive to a current cell load condition;
        selecting a level of aggregation for reducing a number of transmissions on a forward link;
        selecting a level of aggregation responsive to a current mobile station geometry;
        selecting a level of aggregation responsive to a mobile station Doppler; or
        aggregating frames into a plurality of aggregated packets and staggering a timing of transmission for at least some of the aggregated packets.

* * * * *